United States Patent Office 3,191,107
Patented June 22, 1965

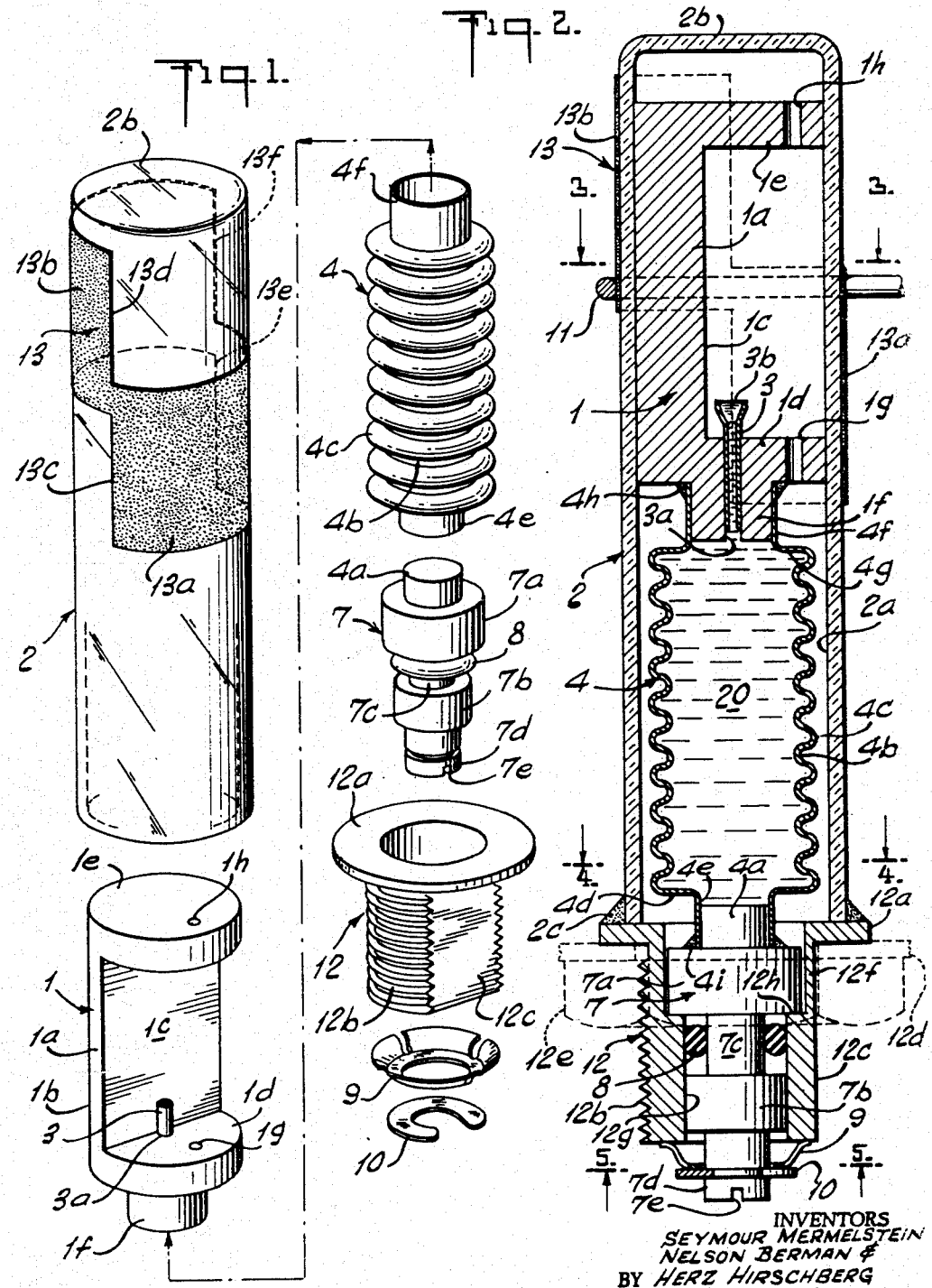

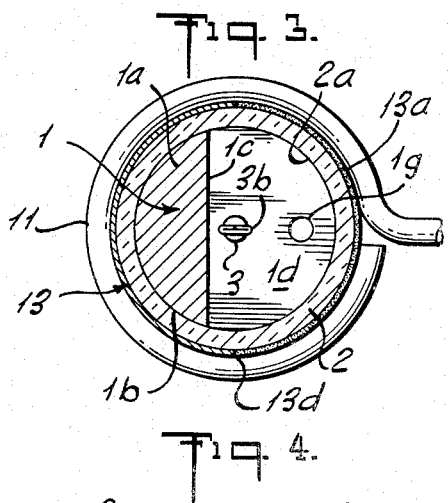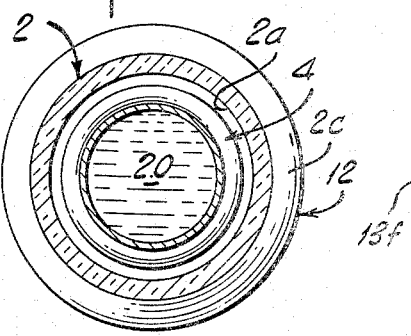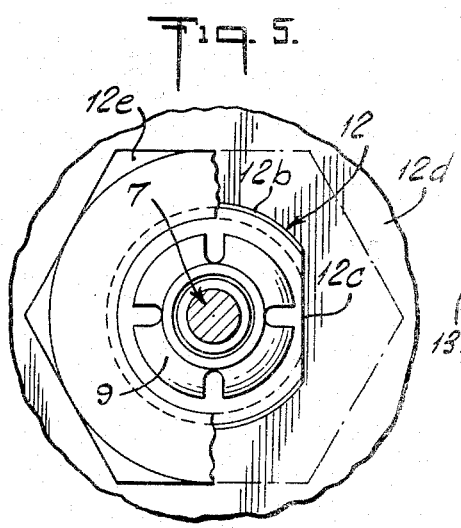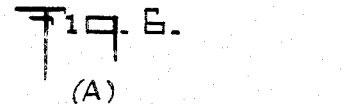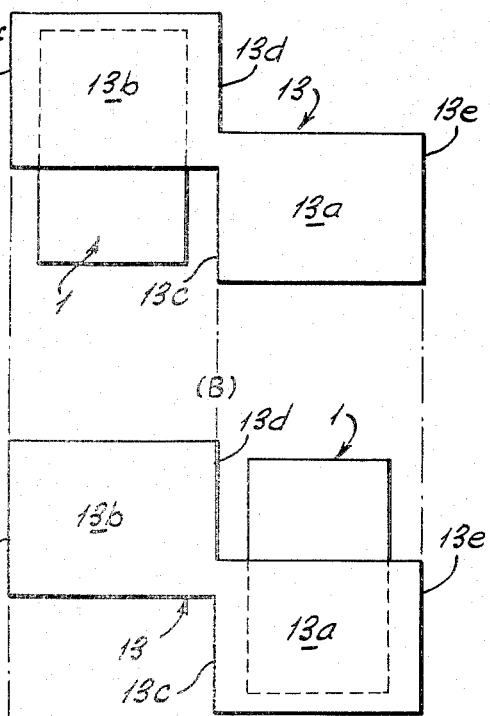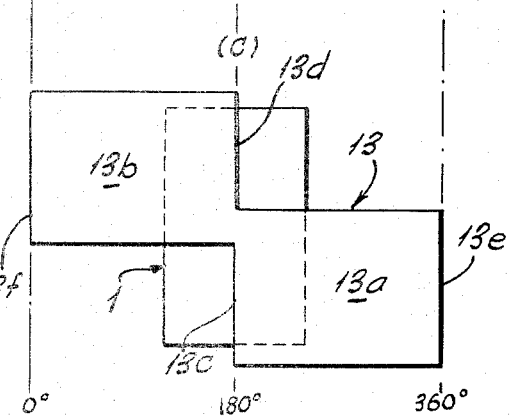

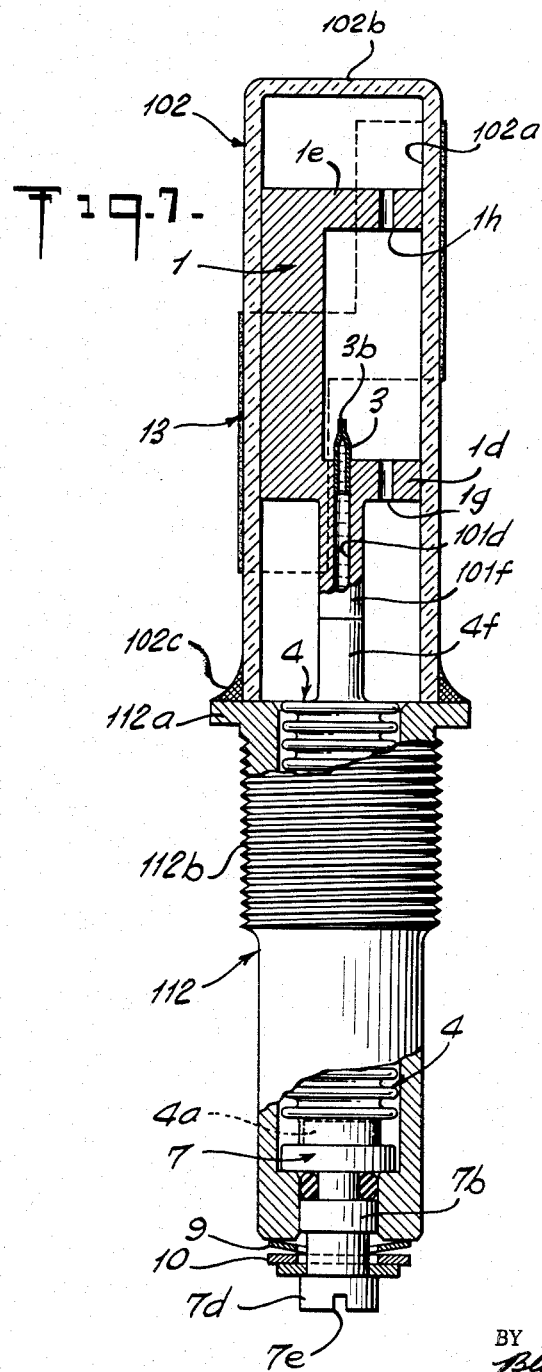

3,191,107
TEMPERATURE COMPENSATING TRIMMER CAPACITOR
Seymour Mermelstein, Brooklyn, Nelson Berman, New Hyde Park, and Herz Hirschberg, New York, N.Y., assignors to JFD Electronics Corporation, Brooklyn, N.Y., an organization of New York
Filed Apr. 18, 1962, Ser. No. 188,459
8 Claims. (Cl. 317—248)

This application relates to an adjustable temperature compensating capacitor, and in particular relates to a capacitor which can be adjusted so as to have a selected temperature coefficient of capacity, which may be negative, positive or zero.

An important object of this invention is to provide a capacitor of the above-described type which may be readily adjusted, which may be made of miniature size and which may be readily designed so as to provide the desired range of temperature coefficients of capacity.

As an important advantage of the invention it is possible by turning a control screw to vary the temperature coefficient of capacity of the device smoothly between maximum positive and negative coefficients, through a zero coefficient. For any given setting of the control screw, the temperature coefficient of capacity can be substantially constant over the operating temperature range.

In accordance with the preferred embodiment of the invention, the capacitor comprises a longitudinally extending tube made of dielectric material and having front and rear ends. There is a metalized conductive pattern on the outside of the tube adjacent its rear end and preferably comprising two longitudinally successive, adjacent, connected, diametrically opposed, semi-cylindrical sectors.

A conducting support is received in the front of the tube so as to be longitudinally fixed but turnable about the axis of said tube and accessible through the front of the tube for turning to selected turned position by means of a screwdriver, for example.

A longitudinally extending, conducting bellows is fixed to the rear of the support and extends rearwardly thereof movably in the bore. The bellows is completely filled with a fluid at one atmosphere which expands and contracts in proportion to temperature changes. Filling is carried out at a selected reference temperature such as 25° C. After filling is completed and the bellows is sealed off, the pressure of the liquid within the bellows (neglecting gravity effects) shall be essentially the same as ambient pressure prior to filling. The bellows is designed so that its spring rate opposes fluid expansion and maintains the bellows longitudinally rigid above reference temperature, while permitting the bellows to expand and contract longitudinally above and below the reference datum in accordance with temperature change. Furthermore, the bellows is designed so that the force of ambient pressure exceeds the bellows spring reaction and maintains the bellows longitudinally rigid below the reference temperature, thereby permitting the bellows to contract longitudinally below the reference temperature.

A longitudinally extending, conducting, part-cylindrical piston is positioned rearwardly of the bellows. The piston is fixed to the bellows so as to move in unison therewith with the periphery of the piston extending frictionally against the wall of the bore. The piston is longitudinally generally centered on the metalized pattern at reference temperature and then terminates short of the remote ends of the sectors. In other words, the sectors overlap the ends of the piston.

As the result of the foregoing, the temperature coefficient of capacity of the capacitor can be varied between selected maximum negative and positive coefficients through a null value, depending upon the turned position of the piston. In other words, if the piston circumferentially opposes the front metalized pattern sector, then the capacitor may have a negative temperature coefficient of capacity. On the other hand, if the piston circumferentially opposes the rear metalized pattern sector, then the capacitor has a positive temperature coefficient of capacity. If the turned position of the piston is such that it equally circumferentially opposes the two sectors, then regardless of the ambient temperature, the same amount of area of metalized conductive pattern is opposed by the periphery of the piston, and the capacity of the device does not change.

It will be apparent that it is within the scope of the invention to move the piston longitudinally by any other suitable means which is responsive to changes in temperature.

Other objects and advantages of the invention will become apparent from the following description, in conjunction with the annexed drawings, in which preferred embodiments of the invention are disclosed.

In the drawings:

FIG. 1 is an exploded side elevational view of the capacitor.

FIG. 2 is a longitudinal section of the capacitor, optional mounting means for the capacitor being shown in phantom.

FIG. 3 is a section on line 3—3 of FIG. 2.

FIG. 4 is a section on line 4—4 of FIG. 2.

FIG. 5 is a section on line 5—5 of FIG. 2.

FIG. 6 is a diagrammatic plan view of the developed metalized pattern on the outer periphery of the dielectric tube. View (A) shows the piston opposing the rear semi-cylindrical sector of the metalized conductive pattern. View (B) shows the piston opposing the front semi-cylindrical sector of the metalized conductive pattern. View (C) shows the piston opposing the two sectors of the metalized pattern equally, corresponding to a zero temperature coefficient of capacity.

FIG. 7 is a longitudinal section of a second embodiment of the invention.

Upon reference to the drawings in detail, it will be noted that they show a longitudinally extending tube 2 made of dielectric material, such as glass. Said tube 2 is cylindrical and has a bore 2a, as well as a rear end closure wall 2b. The front end of tube 2 is open and is fixed to a longitudinally extending, generally cylindrical metal mounting base 12. This base 12 has a rear outwardly extending peripheral flange 12a against which the front of tube 2 abuts, the tube 2 being fixed to flange 12a by means of solder 2c. Said base 12 is preferably generally cylindrical and is screw-threaded at 12b on its outer periphery. One portion of the periphery of base tube 12 has a longitudinally extending cut 12c extending the full length thereof. As shown in FIG. 2, base 12 may be extended through metal frame mounting plate 12d having a hole of shape corresponding to the peripheral shape of base 12 so as to determine the desired turned orientation of tube 2 with respect to frame plate 12d. A securing nut 12e may be screwed over the periphery of tube 12 and against the frame plate 12d. Plate 12d may be grounded.

A metalized conductive pattern 13, optionally silver, is deposited on the outside of tube 2 adjacent its rear end. Said metalized pattern 13 comprises two longitudinally successive, adjacent, connected, diametrically opposed, semi-cylindrical sectors 13a and 13b, preferably of the same length. Specifically, the front sector is designated by the reference numeral 13a and the rear sector by the reference numeral 13b. In view of the fact that the two sectors 13a and 13b are diametrically opposed and semi-cylindrical, they have respective pairs of aligned side edges 13c and 13d on the one hand, 13e and 13f on the other hand. Preferably, in order to provide the connection between the two sectors 13a and 13b, they overlap slightly longitudinally, so that in effect the pairs of edges 13c and 13d, on the one hand and 13e and 13f on the other, overlap, as clearly shown in FIG. 1.

Support 7 is received in base 12, so as to be longitudinally fixed but turnable about the axis of base 12. Specifically, but without limitation thereto, support 7 optionally comprises a rear cylindrical portion 7a which is turnably received within the rear cylindrical wall portion 12f of the tubular base 12. The front portion 12g of the bore of tube 12 is of reduced diameter so as to define an annular shoulder 12h at the junction of the two bore portions, against which the front face of support portion 7a turnably abuts. Support 7 has a further cylindrical portion 7b spaced forwardly of portion 7a and turnably received within the bore portion 12g. The two support portions 7a and 7b are connected by a portion 7c of reduced diameter, and an O-ring 8 is received around the support portion 7c and frictionally within the bore portion 12g, as clearly shown in FIG. 2.

Said support portion 7b has a front extension or head 7d of reduced diameter which protrudes forwardly out of the front of the bore of support 12. Said support extension 7d has a front slot 7e for reception of a screwdriver or the like.

Retaining ring 10, of any suitable shape such as shown in FIG. 1, is snapped into a groove of support extension or head 7d intermediate the ends thereof. An annular spring washer 9, clearly shown in FIG. 1 and 2, is extended over over head 7d and bears between retaining ring 10 and the front of tubular base 12 to provide the desired axial loading of the parts so as to insure against longitudinal motion of support 7.

It will further be apparent that the assembly has sufficient friction to insure that the support 7 will readily remain in its selected turned position.

Longitudinally extending bellows 4 is fixed to the rear of support 7 and extends rearwardly thereof movably in bore 2a. Specifically, a solid cylindrical, axially extending metal stud 4a is connected integrally to the rear face of support portion 7a and extends rearwardly thereof. Bellows 4 is made of any appropriate flexible and resilient metal so as to have the usual longitudinally successive inturned folds 4b and out-turned folds 4c for the desired corrugated structure. Said bellows 4 has a front annular wall 4d which connects at its center with a tubular extension 4e which extends forwardly and fits frictionally over stud 4a. Bellows 4 is secured at its front end by solder 4i to the rear face of element 7a.

A longitudinally extending, metal, part-cylindrical piston or slug 1 is positioned rearwardly of bellows 4. Specifically, said piston 1 has an intermediate elongated portion 1a with a part-cylindrical periphery 1b corresponding in cross section to the minor arc of a circle and conforming peripherally to curvature to the periphery of bore 2a. Said piston portion 1a has an inner longitudinally extending planar face 1c. Piston 1 further has short or disc-like cylindrical front and rear transverse end flanges 1d and 1e connecting integrally with the portion 1a. Said flanges 1d and 1e extend frictionally turnably and slidably in bore 2a. The result of the construction is to present the surface 1b to the bore 2a, and to make it possible to turn the piston circumferentially so as to dispose it primarily in opposition to either of the sectors 13a or 13b, or in intermediate position as will be discussed more fully below.

Disc 1d has a front coaxial boss or stud 1f which extends into a rear coaxial extension 4f of annular rear wall 4g of bellows 4. The tubular extension 4f is fixed to bellows disc 1d by means of solder 4h.

The bores 1g and 1h permit passage of air or the like in tube 2 for equalization of pressure.

Piston 1 has an axial bore 3a extending through disc 1d and boss 1f, inwardly of the part-cylindrical portion 1a. Filling tube 3 extends frictionally into bore 3a and also extends rearwardly of disc 1d. Said tube 3 may be made, for example, of a soft metal. Tube 3 is originally made longer for filling purpses and then crimped, cut, and soldered, as shown in 3b. An appropriate filling fluid 20 may be drawn into bellows 4 through tube 3, and the head portion 3 may then be crimped, soldered, or otherwise closed so as to seal the interior space of bellows 4.

The fluid 20 may be an appropriate fluid which expands and contracts in correspondence to respective increases and decreases in ambient temperature. Fluid 20 is preferably a liquid; for example, a sol silicone oil. A stable liquid possessing a very high vapor pressure is usually employed. The cubical coefficient of expansion should be highly linear over the required operating temperature range.

Optionally, the bellows 4 may be filled with the fluid 20 at selected datum or reference temperature, such as 25° C. Sufficient fluid is placed in the bellows so as to render the bellows completely filled and longitudinally rigid. The spring rate of the bellows is such that it opposes fluid expansion and maintains the bellows longitudinally rigid with change in temperature above and below datum temperature. Below datum temperature, the force of the ambient pressure on the bellows exceeds the bellows spring reaction and maintains the bellows longitudinally rigid upon change of temperature below the datum temperature. As an important consideration, the bellows is sufficiently stiff so that it cannot expand or contract radially under ambient pressure.

As the result of the foregoing, bellows 20 expands and contracts in response to changes in ambient temperature, and optionally the bellows design and the fluid can be such that the change in length of the bellows is substantially a linear function of temperature. It will be further apparent that the piston 1 moves in unison with the bellows, both longitudinally and also circumferentially upon turning of the head 7d by means of a screwdriver in slot 7e.

Preferably, the length of the piston 1 is slightly less than the total length of metalized pattern 13. Preferably, also, at reference datum, as shown in the drawing, piston 1 is longitudinally centered with respect to the metalized pattern 13. In other words, in the reference position, the front end of piston 1 is located slightly rearwardly of the front endge of metalized pattern sector 13a, and the rear end of piston 1 is located slightly forwardly of the rear edge of metalized pattern sector 13b.

Three turned positions of piston 1 are illustratively shown in FIG. 6. In view (A) of FIG. 6, piston 1 is turned so that its peripheral surface 1b closely circumferentially opposes the rear sector 13b. Since piston 1 projects forwardly of sector 13b, it will be apparent that upon increase in temperature, and resulting expansion of bellows 4, a greater proportion of piston 1 opposes metalized pattern sector 13b, resulting in increase in capacity of the device. Conversely, upon reduction in temperature, the piston 1 moves forwardly and the capacity of the device is lowered. Accordingly, in this position of piston 1, the device has a positive temperature coefficient of capacity.

In view (B) of FIG. 6, piston surface 1b circumferentially opposes metalized pattern sector 13a. Upon increase in temperature, the area of surface 1b opposing sector 13a is reduced and the capacity of the device is lowered. Conversely, upon increase in temperature, and resulting forward movement of piston 1, the capacity of the device is increased. Accordingly, in this position of piston 1, the device has a negative temperature coefficient of capacity.

In view (C) of FIG. 6, the turned position of piston 1 is such that its surface 13b is centered upon the sector edges 13d and 13c. In this position, regardless of the longitudinal position of the piston, as long as it is between the front and rear edges of the metalized pattern, the total amount of area of surface 1b which opposes the respective sectors 13a and 13b is constant. Accordingly, in this position, the value of the temperature coefficient of capacity is zero.

It will be apparent that the piston 1 may have a continuum of turned positions intermediate its position of view (B) of FIG. 6 and its respective positions of views (A) and (C). Accordingly, it is possible to provide a selected negative or positive temperature coefficient of capacity, depending upon the turned position of the piston, within a range of maximum and minimum values.

While the use of bellows 4 with fluid filling 20 is preferable, it will be apparent that any other appropriate means may be provided for making the longitudinal position of piston 1 responsive to temperature change, while permitting turning of the piston to vary the temperature coefficient of capacity. It will further be apparent that the shapes and sizes of the respective metalized pattern sectors 13a and 13b may be varied depending upon the desired capacity characteristics of the device.

FIG. 7

In this embodiment, the means for mounting the movable parts are varied, but the principle of operation is the same as in the first embodiment.

In FIG. 7, tube 102 of dielectric material replaces tube 2 and has bore 102a and rear end closure wall 102b. Tube 102 is shorter than tube 2. Mounting base 112 replaces and is longer than base 12. Base 112 has a rear outwardly extending peripheral flange 112a against which the front of tube 120 abuts, the tube 102 being fixed to flange 112a by means of solder 102c. Base 112 is externally screw-threaded at 112b adjacent flange 112a. The metalized conductive pattern 13 on the outside of tube 102 is the same as in the first embodiment. Support 7 is received in the front portion of base 112, similarly as in the first embodiment. Support 7 has a rear stud 4a in both embodiments, but in FIG. 7 stud 4a is spaced considerably to the rear of the flange 112a to allow space in base 112 for reception of bellows 4.

In FIG. 7, bellows 4 is substantially wholly received within base 112. Piston 1 is received within tube 102. Stud or boss 101f is elongated with respect to stud 1f, and bellows extension 4f is mounted upon stud 101f. Passage 101d corresponds to passage 1d and extends the full length of stud 101f.

In FIG. 7, the bellows 4 is received frictionally turnably within the bore of base 112, as contrasted to the clearance space between bellows 4 and the peripheral wall of tube 2 in the first embodiment. The arrangement of FIG. 7 is mechanically stronger and somewhat more convenient to assemble.

While a preferred embodiment of the invention has been disclosed, and various possible changes, omissions and additions have been indicated therein, it will be apparent that various other changes, omissions and additions may be made in the invention without departing from the scope and spirit thereof.

What is claimed is:

1. Adjustable temperature compensating capacitor comprising longitudinally extending tube made of dielectric material, metalized conductive pattern on the outside of said tube having two longitudinally successive adjacent, connected, circumferentially offset sectors, a longitudinally extending, conducting piston in said bore said piston having a part-cylindrical peripheral wall, said piston having means accessible from outside said tube for turning said piston to selected position, and means in said tube coupled to said piston moving said piston longitudinally in direction and amount according to direction and magnitude of temperature change, said piston being longitudinally generally centered on said metalized pattern at selected reference temperature and then terminating short of the remote ends of said sectors; whereby the capacity of said capacitor as a function of temperature can be varied between negative and positive coefficients through a constant value depending upon the turned position of said piston.

2. Adjustable temperature compensating capacitor comprising:
longitudinally extending tube made of dielectric material;
metalized conductive pattern on the outside of said tube having two longitudinally successive adjacent, connected, circumferentially offset sectors;
longitudinally extending bellows having closed ends and turnably and longitudinally slidably received within the bore of said tube;
means supporting one end of said bellows turnably and non-slidably and accessible from outside said tube and adapted to be manipulated to turn said bellows to selected turned position;
said bellows completely filled with a fluid filling so as to be longitudinally rigid, said filling expanding and contracting in proportion to temperature changes, said bellows thereby expanding and contracting longitudinally as a function of temperature; and
longitudinally extending, conducting piston in said bore said piston having a part-cylindrical peripheral wall, means fixing the said piston to the other end of said bellows to move in unison therewith with the periphery of said piston extending frictionally against the wall of said bore; said piston being generally longitudinally centered on said metalized pattern at selected temperature and then terminating short of the remote ends of said sectors;
whereby the capacity of said capacitor as a function of temperature can be varied between negative and positive coefficients through a constant value depending upon the turned position of said piston.

3. Adjusting temperature compensating capacitor comprising:
longitudinally extending tube having front and rear ends and a rear portion of dielectric material;
metalized conductive coating on the outside of the rear portion of said tube and comprising two longitudinally successive, adjacent, connected, diametrically opposed, semi-cylindrical sectors;
support received in the front of said tube so as to be longitudinally fixed but turnable about the axis of said tube and accessible through the front of said tube and adaptable for turning to selected turned position;
longitudinally extending bellows having closed ends and fixed to the rear of said support and extending rearwardly thereof movably in the bore of said tube and completely filled with a fluid filling so as to be longitudinally rigid, said fluid expanding and contracting in proportion to temperature changes, said bellows thereby expanding and contracting longitudinally as a function of temperature and turnable in unison with said support; and
longitudinally extending, conducting piston in said bore positioned rearwardly of said bellows said piston having a part-cylindrical peripheral wall, and means fixing said piston to said bellows to move in unison therewith with the periphery of said piston extending frictionally against the wall of said bore, said piston being longitudinally generally centered on said metalized pattern at selected temperature and then terminating short of the remote ends of said sectors; whereby the capacity of said capacitors as a function of temperature can be varied between negative and positive coefficients through a constant value depending upon the turned position of said piston.

4. Capacitor in accordance with claim 3, the spring rate of said bellows opposing fluid expansion and maintaining said bellows longitudinally rigid above reference temperature, force of ambient pressure exceeding bellows spring reaction and maintaining said bellows longitudinally rigid below reference temperature.

5. Adjustable temperature compensating capacitor comprising:
longitudinally extending cylindrical tube having front and rear ends and a rear portion of dielectric material;
metalized conductive pattern on the outside of said rear portion of said tube and comprising two longitudinally successive and overlapping, adjacent, connected, diametrically opposed, semi-cylindrical sectors;
support received in the front of said tube so as to be longitudinally fixed but turnable about the axis of said tube and accessible through the front of said tube and adaptable for turning to selected turned position;
longitudinally extending bellows having closed ends and fixed to the rear of said support so as to be turnable in unison therewith and extending rearwardly thereof movably in the bore of said tube, said bellows being completely filled with a fluid filling so as to be longitudinally rigid, said fluid expanding and contracting in proportion to temperature changes, the said bellows thereby expanding and contracting longitudinally as a function of temperature, the spring rate of said bellows opposing fluid expansion and maintaining said bellows longitudinally rigid above reference temperature, a force of ambient pressure exceeding bellows spring reaction and maintaining said bellows longitudinally rigid below reference temperature;
longitudinally extending, conducting piston positioned in said bore rearwardly of said bellows said piston having a part-cylindrical peripheral wall, said piston having end discs frictionally turnable and slidable in said bore, the front disc having a through filling passage, means fixing said front disc to said bellows with said passage communicating with the interior of said bellows, and means sealing said passage, said piston being generally longitudinally centered on said metalized pattern at reference temperature and then terminating short of the remote ends of said sectors; whereby the capacity of said capacitors as a function of temperature can be varied between negative and positive coefficients through a constant value depending upon the turned position of said piston.

6. Capacitor according to claim 5 said tube being entirely of glass.

7. Capacitor according to claim 5, the front portion of said tube being of metal, said bellows being frictionally received within said front portion of said tube.

8. Adjustable temperature compensating capacitor comprising longitudinally extending dielectric member having inner and outer surfaces, metalized conductive pattern on the outer surface of said dielectric member having a pair of longitudinally adjacent, connected, laterally displaced sectors, a longitudinally extending, conducting slug member, means mounting said slug member against the inner surface of said dielectric member so as to be laterally adjustable between extreme positions of maximum lateral registration with the respective sectors, and means coupled to said mounting means moving said slug member longitudinally in direction and amount according to direction and magnitude of temperature change, said slug being generally longitudinally centered on said metalized pattern at selected temperature and then terminating short of the remote ends of said sectors; whereby the capacity of said capacitor as a function of temperature can be varied between negative and positive coefficients depending upon the lateral position of said slug member.

References Cited by the Examiner
UNITED STATES PATENTS

| 1,589,204 | 6/26 | Miller | 317—249 |
| 2,714,184 | 7/55 | Peck | 317—245 |
| 3,071,716 | 1/63 | Young | 317—248 |

JOHN F. BURNS, *Primary Examiner.*

DARRELL L. CLAY, *Examiner.*